Oct. 20, 1964    C. E. NAPERALA ETAL    3,153,540
PISTON RING ASSEMBLY
Filed April 7, 1961

INVENTORS
CLEMENT E. NAPERALA & LEWIS M. DAVIS
BY
Barnes, Kisselle, Raisch & Choate
ATTORNEYS United States Patent Office 3,153,540
Patented Oct. 20, 1964

3,153,540
PISTON RING ASSEMBLY
Clement E. Naperala and Lewis M. Davis, Muskegon, Mich., assignors to Sealed Power Corporation, Muskegon, Mich., a corporation of Michigan
Filed Apr. 7, 1961, Ser. No. 101,491
1 Claim. (Cl. 277—75)

This invention relates to improvements in piston rings and more particularly to an oil control ring assembly for use in the oil groove of a piston in an internal combustion engine.

The axial width of the oil ring grooves in the pistons of most automotive and truck engines presently in operation does not exceed one-quarter of an inch. However, some makes and models of such engines have been manufactured in the last decade having oil ring grooves exceeding this maximum width by as much as one-eighth of an inch. The volume of replacement sales of rings designed to fit such oversize grooves is sizeable, but it is not sufficient to justify the cost of the necessary new equipment to produce a special oversize ring. Consequently, piston ring manufacturers have supplied the demand created by such engines by combining a standard width oil ring with extra segments or another ring of some type to fill up the oil groove.

One such assembly supplied for the above purpose includes an oil control ring assembly substantially as disclosed in United States Patent No. 2,789,872, issued April 23, 1957, to Holly M. Olson, together with a conventional, self-expanding cast iron oil ring of sufficient axial thickness to fill up the oil groove. The Olson piston oil ring assembly includes an annular circumferential abutment, non-bottoming type of expander-spacer comprising a corrugated ribbon of spring steel which is disposed between a pair of thin, parted cylinder engaging rails to form therewith a three-piece composite oil ring. With the additional cast iron filler ring, this oversize ring assembly consists of four-pieces and is therefore that much more difficult to insert in the groove of the piston.

Accordingly it is an object of the present invention to provide an improved oil control piston ring assembly for use in oversize oil grooves which is no more expensive to load therein than are standard composite oil rings in standard size oil grooves.

Another object is to provide an improved piston oil ring assembly adapted to fit oversize oil grooves which has a better oil control characteristic than that of oil ring assemblies previously available for such oversize grooves.

A further object is to provide an improved oversize oil control piston ring assembly which includes standard size parts and which requires fewer parts in the overall assembly than previous oversize oil ring assemblies, thereby substantially reducing the cost of the assembly to the user.

Figure 1:
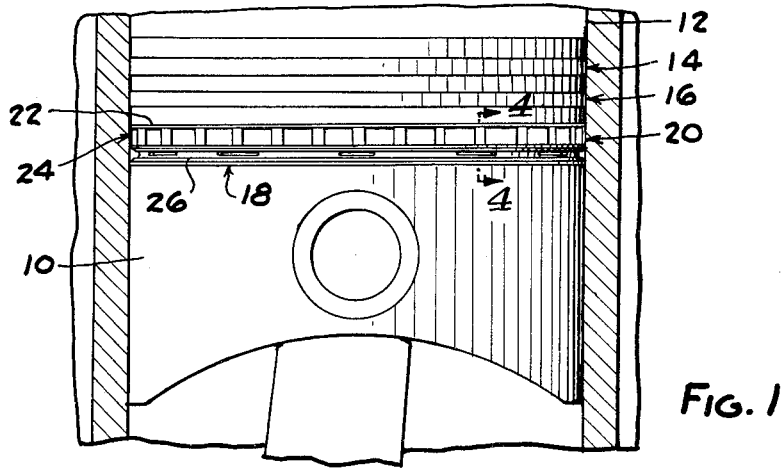
FIG. 1 is a fragmentary elevational view of a piston having an oversize oil groove in which is mounted an oil control ring assembly of the invention.

Referring in detail to the accompanying drawing, FIG. 1 shows a piston 10 adapted to reciprocate in a cylinder 12 and having conventional compression rings 14 and 16 disposed in the upper two circumferential ring grooves of the piston. An oil control groove 18 is located below the compression grooves and disposed therein is an oil control ring assembly 20 provided in accordance with the invention. It is to be understood that groove 18 has an axial width exceeding that of the maximum width of the majority of oil grooves provided in automotive and truck engines currently in operation.

Figure 2:
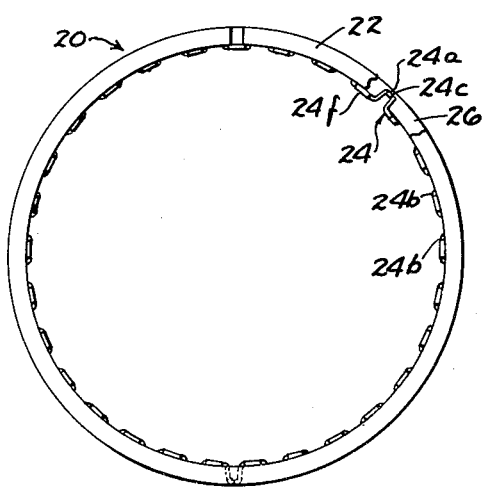
FIG. 2 is a plan view of the oil control ring assembly of the invention with a portion thereof broken away to illustrate the various parts thereof.
Figure 3:
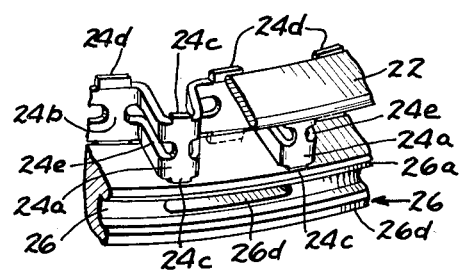
FIG. 3 is an enlarged fragmentary perspective view of a portion of the above oil control ring assembly.
Figure 4:
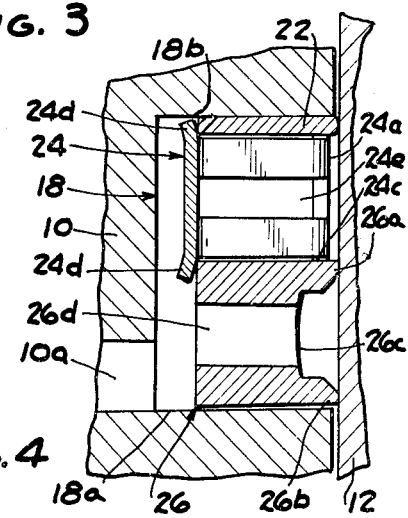
FIG. 4 is a greatly enlarged elevational view taken in cross section on line 4—4 of FIG. 1 illustrating the oil control ring assembly of the invention mounted in the oversize oil groove of the piston.

As shown in FIGS. 2–4, the oil control ring assembly of the invention is a three-piece composite ring two parts of which are similar to the corresponding parts of the oil ring disclosed in the aforesaid patent; namely, a thin, annular, parted metal rail 22 and a spacer-expander 24. These two parts are commercially available with axial widths such that when two of the rails 22 are assembled against the top and bottom edges of a suitably sized spacer-expander 24 the total axial dimension of the composite ring corresponds to the standard widths of piston oil grooves, such as five-thirty secondths, three-sixteenths, and one-quarter inches.

Spacer-expander 24 is a non-bottoming type, self-expanding spring member formed from flat ribbon metal stock into an annular configuration which is corrugated to provide alternate outer and inner series of crowns 24a and 24b respectively and which are joined by generally radial flexing portions intermediate the crowns. Each of the outer crowns 24a has a short pad 24c extending parallel to the axis of expander-spacer 24 from each longitudinal edge thereof (FIG. 3), while each of the inner crowns 24b has a somewhat longer lip 24d extending from each of the longitudinal edges thereof. Lips 24d are inclined at an angle of 5° to 25° to the planes of inner crowns 24b (FIG. 4). Spacer-expander 24 also has a plurality of oil conducting passages or slots 24e which run parallel to the upper and lower longitudinal edges of the spacer-expander in the radial portions thereof and which extend between and partly into outer and inner crowns 24a and 24b. In addition to conducting oil, slots 24e provide a controlled flexing tension when spacer-expander 24 is compressed and the members associated therewith are closed at their partings.

The third part of the three-piece composite oil ring assembly 20 of the invention comprises an annular, parted cast iron oil ring 26 which when assembled with rail 22 and spacer-expander 24 is disposed between the latter and the lower side 18a of oil groove 18. As is apparent from FIGS. 1 and 4, the "lower" side 18a of oil groove 18 is the side closest to the crankcase side of piston 10 and farthest from the combustion chamber side of the piston. The term "lower," and conversely the term "upper," are used in this sense for ease of description herein but relate to the combustion chamber as the reference point. Ring 26 is of one-piece construction and has upper and lower flanges 26a and 26b respectively which are spaced axially apart and which have outer peripheral edges adapted to slidably engage the wall of cylinder 12. The outer peripheral face of ring 26 between flanges 26a and 26b is recessed to provide an annular oil collecting groove 26c therein. A plurality of oil conducting passages or slots 26d extend radially through ring 26 so as to connect oil collecting groove 26c with the interior of oil groove 18. Oil delivered thereto via slots 24e and 26d drains to the hollow interior of piston 10 via a circumferential series of oil passages 10a extending radially inward from the vertical bottom surface of oil groove 18.

The three pieces of the composite oil ring 20 comprising thin rail 22, spacer-expander 24 and cast iron filler ring 26 when assembled in the relationship shown in FIG. 4 have a total axial dimension designed to provide a snug sliding fit of ring 20 between the upper and lower sides 18b and 18a of the oversize oil groove 18. Rail 22 rides on the pads 24c extending from the upper edges of outer crowns 24a and is urged into sliding, sealing engagement with the wall of cylinder 12 and with the upper side 18b of groove 18 by its engagement with inclined lips 24d extending from the upper edges of inner crowns 24b. Spacer-expander 24 is in turn supported on the upper surface of filler ring 26 by means of pads 24c extending from the lower edges of outer crowns 24a. The radial dimension of ring 26 between the inner peripheral face thereof and the outer peripheral edges of flanges 26a and 26b is substantially the same as the radial dimension between the inner and outer peripheral edges of rail 22. Hence, the inclined lips 24d extending downwardly from the lower edges of inner crowns 24b engage the upper, inner corner edge of ring 26 so that it, like rail 22, is biased axially against the lower side 18a of the oil groove as well as radially outward against the wall of cylinder 12.

It is to be understood that both the upper rail 22 and the lower filler ring 26 are practically "dead rings"; that is, they provide little or no self-expanding action, the radially outward expansion forces being obtained from the spacer-expander 24 positioned behind them. Preferably, the inside diameter of filler ring 26 in the free condition thereof is slightly smaller than the diameter of spacer-expander 24 taken along the lower edges of the outer faces of inner crowns 24b when the ends of the spacer-expander are abutting. In other words, since it need not be self-expanding, filler ring 26 may be made with a smaller free parting gap than that of the aforementioned conventional, self-expanding cast iron oil ring hitherto used with the Olson type three-piece oil ring to fill up oversize oil grooves. Filler ring 26 therefore assists in ring-to-piston assembly since it tends to hug spacer-expander 24 so that these pieces cling together and thereby are more easily handled when the assembly is loaded in the oversize oil groove of the piston.

It will be seen that filler ring 26 replaces both the thin bottom rail normally associated with a standard size three-piece composite ring of the aforesaid Olson type as well as the extra segment or filler ring previously added as a fourth piece to such composite rings to enable the latter rings to be used in oversize oil grooves. Thus, only three pieces need be handled in assembling oil ring assembly 20 and only one of these pieces, filler ring 26, need be custom made for the oversize oil groove.

In addition to the ease of assembling the oversize three-piece ring assembly 20 as contrasted to prior art four-piece rings, it has been found that the composite oil ring 20 provides substantially improved oil control over that of such prior rings. Improved side sealing is obtained between the lower side of ring 26 and lower side 18a of oil groove 18. Hence, it is believed that this unexpected improvement in performance is due to the cooperation of spacer-expander 24 and filler ring 26 wherein a side-sealing force as well as a cylinder-wall-engaging force is obtained. The elimination of the thin lower rail of the prior art assemblies appears to prevent pinching or sluggish action of filler ring 26. Also contrary to what might be expected, filler ring 26 does not tilt sufficiently to cause uneven wear between the upper and lower sides of the oil groove.

We claim:

An oil ring assembly for an internal combustion engine piston reciprocable in a cylinder between a combustion chamber and crankcase of the engine, said ring assembly comprising a thin flat annular parted cylinder engaging rail, a filler ring and a generally circular spacer-expander of the circumferentially self-supporting type disposed axially between said rail and ring, said spacer-expander comprising a radially corrugated length of flat metal ribbon stock having abutting ends and longitudinal edges disposed parallel to the respectively adjacent sides of said ring and rail, the corrugations comprising an outer and inner circular series of crowns extending axially between said longitudinal edges, the crowns of the two series alternating with respect to each other and said two series of crowns being concentric, said alternate inner and outer crowns having integral connecting legs extending generally radially from one to the other, each leg having two axially spaced portions generally paralleling each other and disposed symmetrically between said longitudinal edges, each inner crown at axially opposite ends thereof having an integral lip extending axially therefrom a predetermined distance beyond the associated longitudinal edge and being inclined radially inwardly of the ring, said spacer-expander thus being adapted to axially space and radially expand said rail and said filler ring when arranged one on each side of said spacer-expander with their inner peripheries engaging the associated lips, said filler ring comprising an annular parted cylinder engaging ring having a side disposed adjacent said spacer-expander with an inner peripheral edge thereof engaged by the lips associated with the adjacent one of said longitudinal edges of said spacer-expander for developing radial expansion and side sealing forces on said filler ring, said side of said filler ring axially abutting said spacer-expander adjacent the outer peripheral edge of said side, said filler ring having an axial width substantially greater than said rail, said filler ring being made of cast iron and having a pair of axially spaced cylinder wall engaging flanges extending radially outwardly from and circumferentially around the outer periphery thereof and defining an annular oil collecting groove recessed therebetween, said filler ring further having a plurality of oil conducting passages formed therein extending from said oil collecting groove to the inner periphery of said filler ring.

References Cited in the file of this patent
UNITED STATES PATENTS

| | | |
|---|---|---|
| 2,260,612 | Fall | Oct. 28, 1941 |
| 2,789,872 | Olson | Apr. 23, 1953 |
| 2,893,798 | Olson | July 7, 1959 |
| 2,951,732 | Brenneke | Sept. 6, 1960 |
| 3,024,029 | Brenneke | Mar. 6, 1962 |